United States Patent
Toda et al.

(10) Patent No.: US 6,438,478 B2
(45) Date of Patent: Aug. 20, 2002

(54) AUTOMATIC LEVELING SYSTEM FOR AUTOMOTIVE HEADLAMPS

(75) Inventors: Atsushi Toda; Hideaki Takeuchi, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/745,710

(22) Filed: Dec. 21, 2000

(30) Foreign Application Priority Data

Dec. 27, 1999 (JP) .......................................... 11-368918

(51) Int. Cl.[7] ................................................ B60L 1/14
(52) U.S. Cl. ........................ 701/49; 307/10.8; 362/466; 362/467
(58) Field of Search ............................. 701/49, 36, 35; 307/10.8, 10.1; 362/465, 466, 467

(56) References Cited

U.S. PATENT DOCUMENTS

| 5,191,530 | A | 3/1993 | Hussmann et al. | .... 364/424.05 |
| 5,907,196 | A | 5/1999 | Hayami et al. | ............. 307/10.8 |

FOREIGN PATENT DOCUMENTS

| EP | 0928719 A2 | 7/1999 | ........... B60Q/1/115 |
| GB | 2309773 A | 8/1997 | ........... B60Q/1/115 |
| GB | 2309774 A | 8/1997 | ........... B60Q/1/115 |
| GB | 2325757 A | 12/1998 | ........... B60Q/1/115 |
| GB | 2341671 A | 3/2000 | ........... B60Q/1/115 |
| GB | 2342149 A | 4/2000 | ........... B60Q/1/115 |
| GB | 2346710 A | 8/2000 | ........... B60Q/1/115 |
| GB | 2346982 A | 8/2000 | ........... B60Q/1/115 |
| JP | 11314547 | 11/1999 | |

OTHER PUBLICATIONS

2002–Derwent Info.—Automatic leveling system for automotive headlamps, controls motor to correct tilting of headlamp optical axis based on vehicle pitch angle irrespective of vehicle condition. (Toda & Takeuchi).*
2001–Derwent Info. Automatic leveling device of headlamp for automobile. (Toda & Takeuchi).*

* cited by examiner

Primary Examiner—William A. Cuchlinski, Jr.
Assistant Examiner—Olga Hernandez
(74) Attorney, Agent, or Firm—Fish & Richardson, P.C.

(57) ABSTRACT

An automatic leveling system has a headlamps optical axes L adapted to tilt vertically relative to a body of a vehicle by driving actuators 10, a control part 16 for controlling the driving of the actuators 10, a vehicle speed sensor 12, a vehicle height sensor 14 and a storage part 20 for storing pitch angle data detected by the vehicle height sensor 14. The control part 16 controls the actuators 10 based on a detected pitch angle such that the optical axes L of the headlamps are inclined to a predetermined angle relative to the road surface.

9 Claims, 8 Drawing Sheets

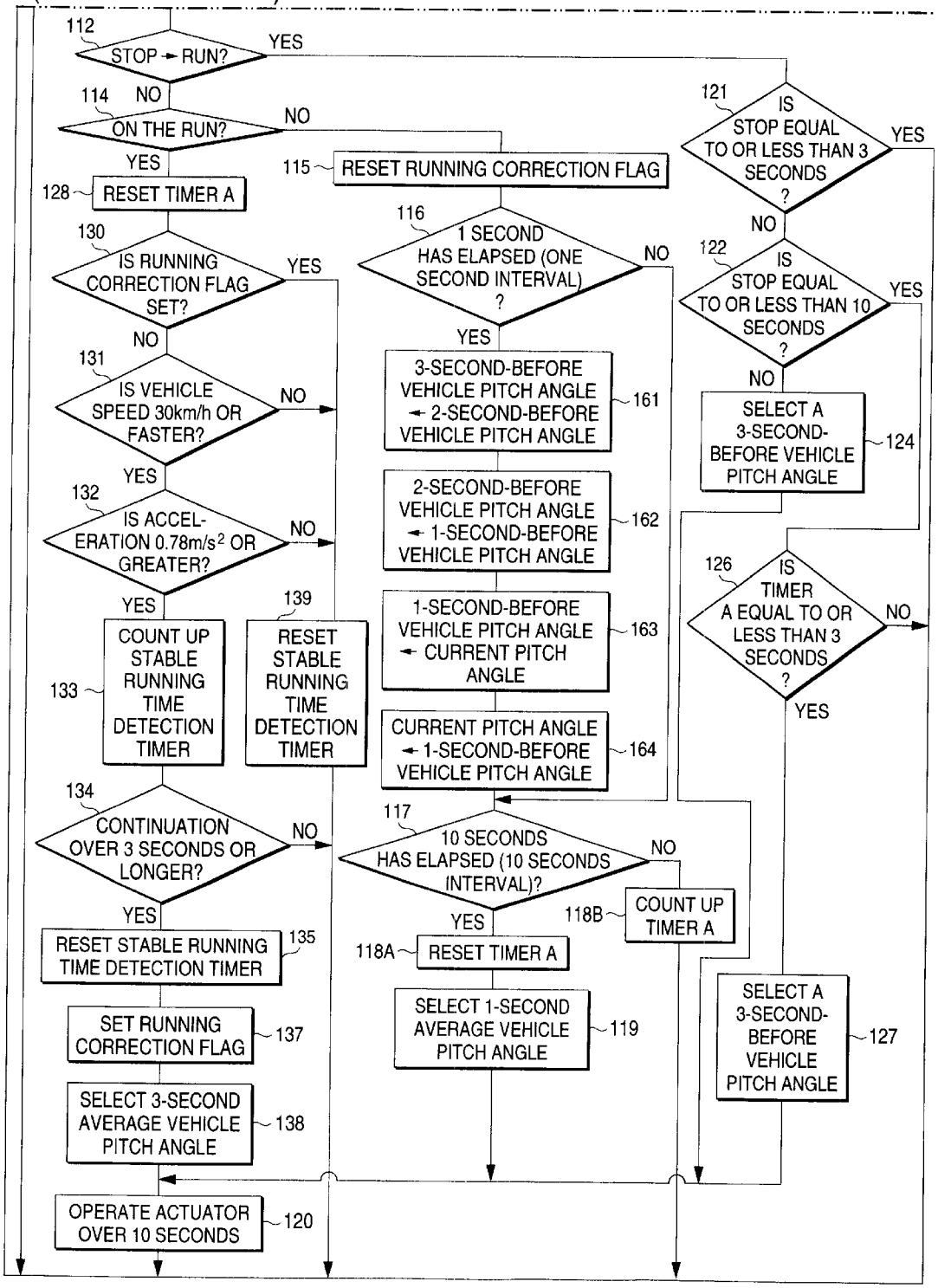

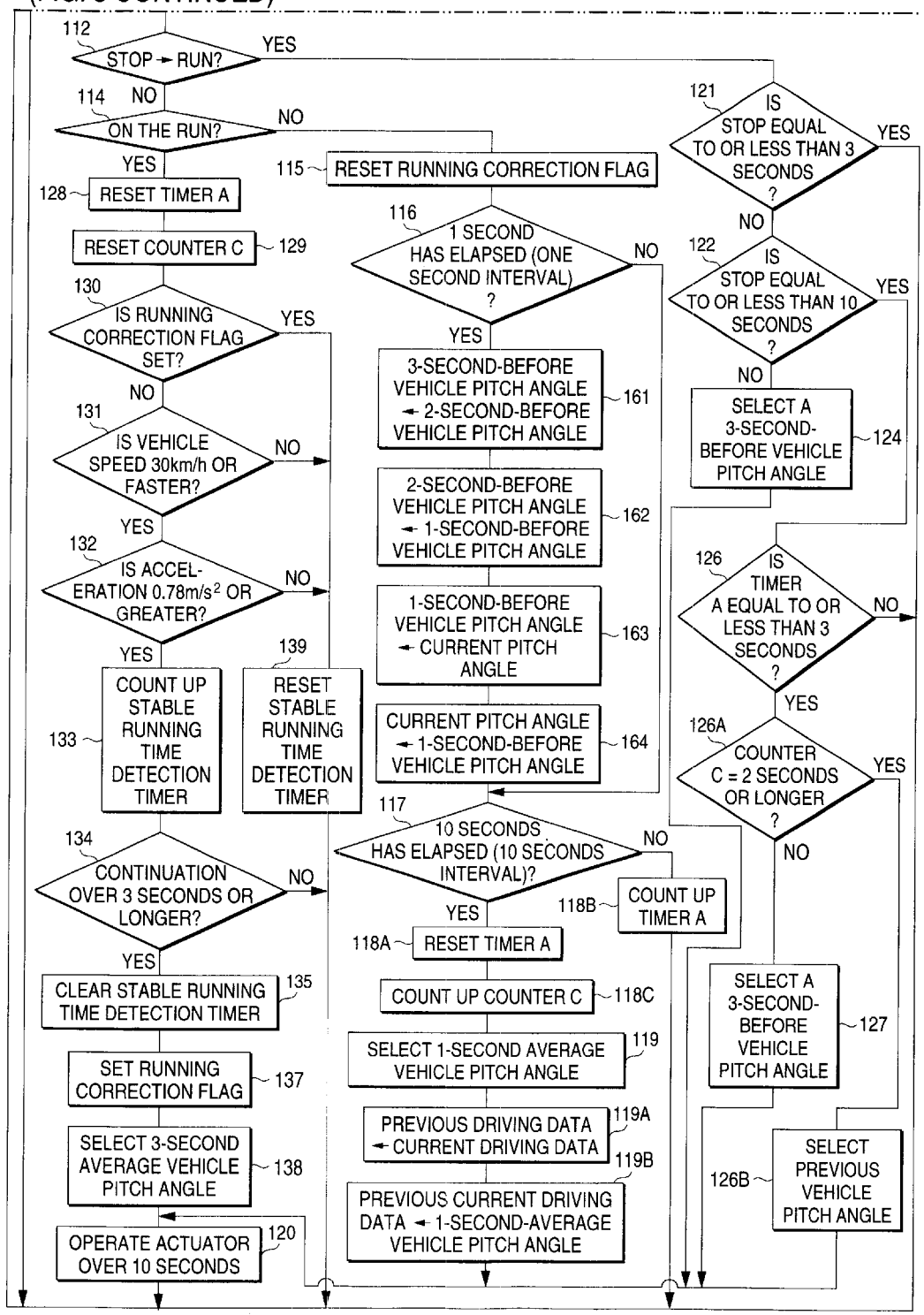

AUTOMATIC LEVELING SYSTEM FOR AUTOMOTIVE HEADLAMPS

FIELD OF THE INVENTION

The present invention relates to an automatic leveling system for adjusting optical axes of atutomotive headlamps based on a pitch angle of a vehicle, and more particularly to an automatic leveling system for vertically adjusting optical axes of headlamps based on a pitch angle of a stationary vehicle.

BACKGROUND OF THE INVENTION

A headlamp of the type used in an automatic leveling system is constructed such that a reflector with a light source securely inserted therein is supported to tilt about a horizontal tilting axis relative to a lamp body. An actuator is used to tilt the optical axis of the reflector (a headlamp) about the horizontal tilting axis.

A conventional automatic leveling system is constituted by a pitch angle detecting means, a vehicle speed sensor, and a control part for controlling the driving of actuators based on detection signals from the detecting means and the sensor, which are provided on a vehicle. The optical axes of headlamps (reflectors) are adjusted to remain in a certain position relative to the surface of a road at all times.

The conventional automatic leveling system automatically levels the headlamps in real-time, such as when a vehicle posture changes because of acceleration or deceleration or when the load is loaded or unloaded, or the passengers get in or out of the vehicle. This increases the operations of the actuators, leading to greater power consumption. Moreover, a high durability is required for driving mechanism components such as motors and gears, which leads to greater production costs.

To provide an automatic leveling system that can reduce the frequency of use of actuators and that is inexpensive and durable, an automatic leveling system was proposed (Japanese Patent Application No.10-274859) in which actuators are driven at predetermined intervals (ten second intervals) while a vehicle is at a stop.

However, while the actuators of the above automatic leveling system are controlled based on a pitch angle detected during a predetermined interval time, if an interval control coincides with the start of the vehicle, automatic leveling cannot be properly performed. The problem is described with reference to FIG. 6.

FIG. 6 is a chart showing changes in vehicle speed and vehicle posture from the start of the vehicle until it reaches a constant running speed. As shown in the chart, it takes a predetermined length of time (T) before the vehicle actually starts running after an accelerator pedal is depressed. In other words, the vehicle speed starts increasing after the predetermined length of time (T) has elapsed. Because of this, the vehicle sensor detects the start of the vehicle at a predetermined start detection delay time T after the accelerator pedal is depressed.

As to the vehicle posture, when the accelerator pedal is depressed, a rear part of the vehicle first lowers and the vehicle continues to remain in that state. That is, when the vehicle sensor detects the start of the vehicle (when a control part detects the start of the vehicle based on an output from the vehicle sensor), the rear part of the vehicle is in a lowered position or, alternatively, the front part of the vehicle is in a raised position.

Because of this, as shown in FIG. 6, there may be a case where the timing of an interval control falls within (T), a time period between the lowering of the rear part of the vehicle by the depression of the accelerator pedal and the detection of the start of the vehicle by the vehicle speed sensor. A vehicle pitch angle for use for interval control in this case is improper because the pitch angle is calculated based on the vehicle's lowered position. The control part is forced to control the actuators based on the improper pitch angle data.

An object of the present invention is to provide an automatic leveling system for automotive headlamps that is inexpensive and that can provide a longer service life by reducing the frequency of use of actuators by controlling the actuators at predetermined intervals. Another object of the invention is to provide an automatic leveling system adapted to operate properly even if the timing of interval control coincides with the start of the vehicle.

SUMMARY OF THE INVENTION

According to a first embodiment of the invention, an automatic leveling system for automotive headlamps comprises headlamps optical axes adapted to tilt vertically relative to a body of a vehicle by driving actuators, a control means for controlling the driving of the actuators, a vehicle speed detecting means for detecting speeds of the vehicle, a pitch angle detecting means for detecting pitch angles of the vehicle and a storage part for storing pitch angle data of the vehicle detected by the pitch angle detecting means. The control means controls the actuators based on the pitch angle data detected by the pitch angle detecting means such that the optical axes of the headlamps are tilted in a certain tilted angle relative to a road surface.

The storage part is configured to store a plurality of data detected at predetermined time intervals.

The control means is configured to control the actuators based on pitch angle data not affected by a change in posture of the vehicle when the vehicle is started and the interval control is carried out substantially at the same time. The control means controls the actuators at predetermined intervals based on the latest pitch angle data.

Additionally, according to a second embodiment of the invention, an automatic leveling system for automotive headlamps is provided such that the start of the vehicle is detected by the vehicle speed detecting means within a predetermined set time after an interval control of the actuators is carried out. The control means determines that the interval control and the start of the vehicle substantially coincide with each other.

Furthermore, according to a third embodiment of the invention, an automatic leveling system for automotive headlamps is provided such that the predetermined set time, which is used to determine whether the interval control and the start of the vehicle coincide with each other, isequal to or longer than a vehicle start detection delay time, which is a time from an accelerator pedal is depressed until the vehicle speed detecting means detects the start of the vehicle.

Pitch angle data generated while the vehicle is at a stop are more accurate than pitch angle data generated while the vehicle is running because there are less disturbing factors when the vehicle is stationary. Since the actuators is controlled based on the more accurate pitch angle data, a more accurate automatic leveling can be provided with the former pitch angle data.

In addition, since the control of the actuators is limited to a certain time interval, the frequency at which the actuators are driven is reduced to that extent. Thus, power consumption is reduced and the wear on the driving mechanism is reduced.

Moreover, the start of the vehicle may be detected by the vehicle speed sensor. If an interval control coincides with the start of the vehicle the actuators may be driven based on an improper pitch angle. A proper automatic leveling can be effected by controlling the actuators based on a proper pitch angle obtained before the depression of the accelerator pedal.

Referring to FIG. 6, a proper automatic leveling process is described in detail. If an interval control of the actuators happens substantially at the same time that the vehicle starts, that is, if an interval control falls within a vehicle start detection delay time T (from the time the accelerator pedal is depressed until the vehicle speed sensor detects the start of the vehicle), a pitch angle used for this specific interval control is that detected by the pitch angle detection means when the interval control occurs. Hence, there may be a risk that the pitch angle data so detected include data generated when the vehicle is lowered when it is about to start. Therefore, the pitch angle data may not be necessarily proper for use. That is, the actuators (automatic leveling) may be driven based on improper pitch angle data.

To address this, instead of a pitch angle detected when the vehicle changes posture, a pitch angle detected prior to the vehicle start detection delay time T (pitch angle data designated by reference character A in FIG. 6 which are detected before the accelerator pedal is depressed) may be used.

Although it varies depending on the type of vehicle, in general, a time of 1 to 3 seconds elapse before the vehicle actually starts. Because of this, it is desirable to set the vehicle start detection delay time to range from 1 to 3 seconds. Whether or not the interval control is carried out substantially at the same time that the vehicle starts can easily be determined if the predetermined set time described in the second embodiment of the invention is set to fall within the range of the vehicle start detection delay time (1 to 3 seconds).

In addition, according to a fourth embodiment of the invention, an automatic leveling system for automotive headlamps is provided such that one or more interval controls have been carried out before an interval control that coincides with the start of the vehicle. Pitch angle data used for an interval control preceding the interval control coinciding with the start of the vehicle, can be used for correcting the headlamp leveling. If an interval control is carried out for the first time, pitch angle data detected just previous to the depression of the accelerator pedal while the vehicle is at a stop, can be used to correct the headlamp leveling. If an interval control is carried out for the first time and if there is no stored pitch angle data detected previously to the depression of the accelerator pedal, the actuators are prevented from being driven.

If a number of interval controls have been carried out, a control based on the latest pitch angle data while the vehicle is at a stop is made possible by using the pitch angle data used for the preceding interval control (the pitch angle data detected while the vehicle is at a stop).

In addition, if the interval control is carried out for the first time, because there is no pitch angle data that are used for the preceding interval control, a control based on the proper pitch angle data is made possible by using pitch angle data detected just prior to the depression of the accelerator pedal (pitch angle data detected before the vehicle speed detection means detects the start of the vehicle, for example, before a predetermined start detection delay time).

Moreover, the actuator is prevented from being driven if the interval control is carried out for the first time and that a time during which the vehicle is stopped is shorter than the predetermined start detection delay time (assuming that there is no pitch angle data preceding the depression of the accelerator pedal). According to a fifth embodiment of the invention, an automatic leveling system for automotive headlamps has a storage part configured such that older pitch angle data are replaced with newer pitch angle data in the order stored, when latest pitch angle data are received so that data can be updated.

Pitch angle data of the predetermined time can be taken out at any time, and the capacity of the storage part does not have to be expanded. According to a sixth embodiment of the invention, an automatic leveling system for automotive headlamps controls the actuators, provided that the headlamps are illuminated.

The actuators are not driven as long as the headlamps are not illuminated, and thus the number of times the actuators are operated is reduced by that extent. Therefore, power consumption can be reduced and the wear on the constituent members of the driving mechanism can be reduced. According to a seventh embodiment of the invention, an automatic leveling system for automotive headlamps configures an interval at which the actuators are driven such that the interval becomes longer than a maximum driving time of the actuators, which is needed to perform a single leveling operation.

If an interval between the previous control and the next control is shorter than the maximum driving time of the actuators, the actuators start the next operation before a target value is reached. In this situation, the actuators will be driven more often and may have their service life reduced. However, according to the construction as set forth in the seventh embodiment of the invention, the actuators are driven in the next control after the actuators have reached their target value in the previous control. Thus, the number of times the actuators are driven is reduced by that extent, and the service life of the actuators is not reduced.

In addition, a change in the pitch angle within the time interval from the previous control until the next control can be omitted without triggering the driving of the actuators by extending the interval at which the actuators are driven. Alternatively, all the operations within the interval can be converged on the driving of the actuators in the next control, and therefore the number of times the actuators is driven is reduced by such an extent.

Additionally, pitch angle data of the vehicle, detected by the pitch angle detection means, are taken into the control part at all times for arithmetic operation as control data, even during intervals between driving operations of the actuators. By using all the pitch angle data that are taken into the control part as control data, many pitch angles can be used as control data. Thus, a proper leveling of the headlamps is attained in association with the detection of the accurate posture (pitch angle) of the vehicle.

Moreover, an automatic leveling system for automotive headlamps, is provided such that while the vehicle is running, when the vehicle runs in a stable running condition over a predetermined length of time where the vehicle speed is equal to or faster than a predetermined value, and the acceleration is equal to or less than a predetermined value, the driving of the actuators is controlled based on pitch angle data resulting during the stable running period. In this case, leveling (optical axes correction) based on the pitch angle data resulting during the stable running condition can function to correct the leveling (optical axes correction) based on pitch angle data resulting while the vehicle is improperly stopped such as along a slope or on a curb.

DETAILED DESCRIPTION OF THE INVENTION

The invention will be described based on following embodiments.

Figure 1:
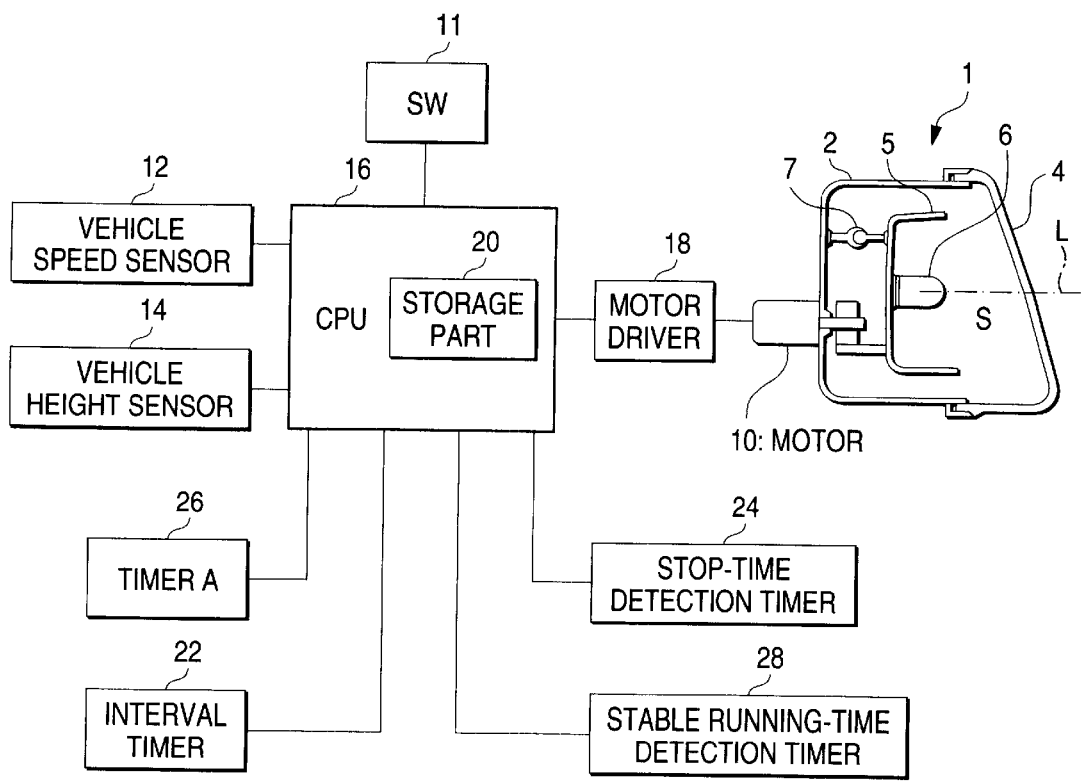
FIG. 1 is a diagram showing a construction of an automatic leveling system for automotive headlamps according to a first embodiment of the invention.
Figure 2:
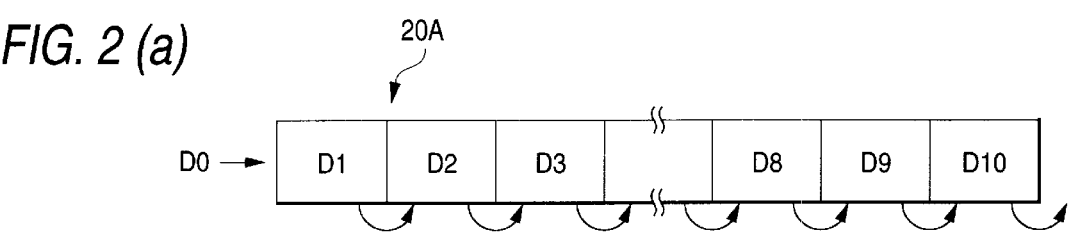
FIG. 2 is a diagram showing a configuration of a storage part of the automatic leveling system.
Figure 2:
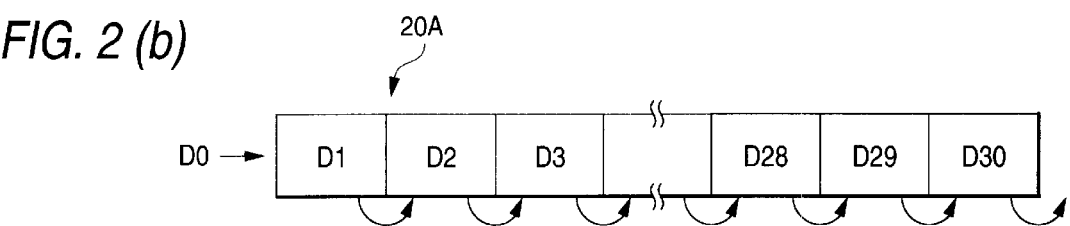
Figure 2:
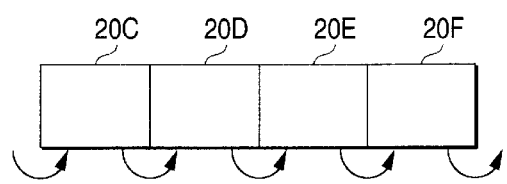
Figure 3:
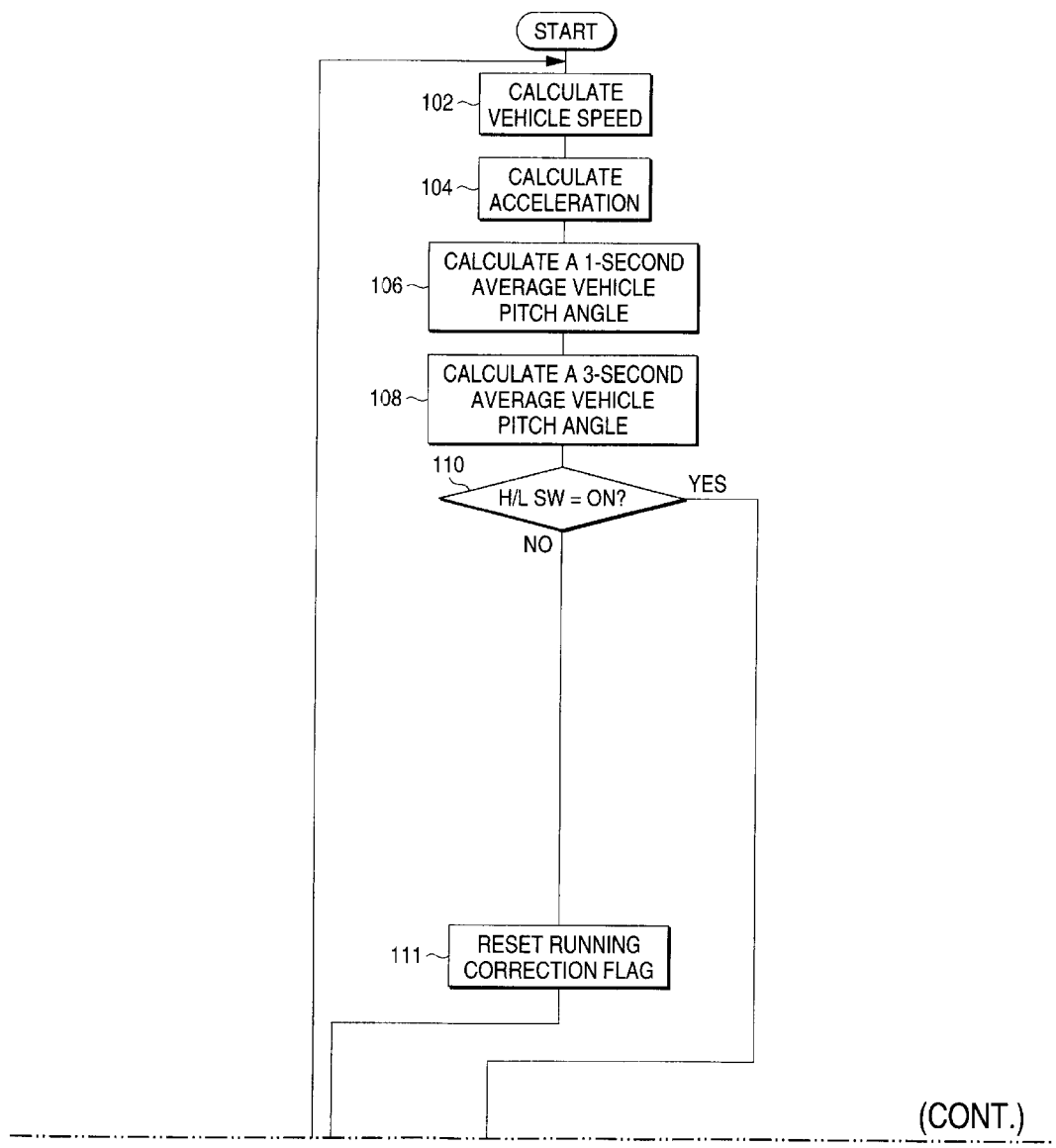
FIG. 3 is a diagram showing a flowchart of a CPU which is a control part of the automatic leveling system.

FIGS. 1 to 3 show one embodiment of the invention. FIG. 1 is a diagram showing a construction of an automatic leveling system for automotive headlamps according to a first embodiment of the invention. FIG. 2 is a diagram showing configurations of a storage part of the automatic leveling system. FIG. 3 is a diagram showing a flowchart of a CPU which is a control part of the automatic leveling system.

In FIG. 1, an automotive headlamp 1 is shown. A front lens 4 is assembled to a front opening in a lamp body 2 to define a lamp chamber S. A parabolic reflector 5 having a bulb 6 which is a light source securely inserted therein is supported in the lamp chamber Sin such a manner as to tilt around a horizontal tilting axis (an axis normal to the surface of the paper on which FIG. 1 is shown) 7, and the reflector 5 is constructed so as to be tilted for adjustment by means of a motor 10 which is an actuator.

An automatic leveling system for the headlamp 1 comprises the motor 10 which is an actuator for adjusting an optical axis L of the headlamp 1 in vertical directions, a lighting switch 11 for the headlamp 1, a vehicle speed sensor 12 which is a vehicle speed detection means for detecting speeds of a vehicle, a vehicle height sensor 14 constituting a part of a pitch angle detecting means for detecting pitch angles of the vehicle, a CPU 16 for determining whether the headlamp 1 is switched on or off, a storage part 20 for storing pitch angle data of the vehicle detected by the vehicle height sensor 14 and calculated by the CPU 16, an interval timer 22 for setting a timing of driving the motor 10, a stop time detecting timer 24 for detecting a time over which the vehicle is stopped, a timer A 26 for detecting a time between a completed interval control and the start of the vehicle, and a stable running time detection timer 28 for detecting a stable running time of the vehicle.

The CPU 16 is configured to determine whether the vehicle is running or at a stop based on a signal from the vehicle speed sensor 12, to calculate pitch angles and accelerations of the vehicle based on signals from the vehicle height sensors 14 and, to send control signals for driving the motor 10 to a motor driver 18 based on the pitch angle data calculated.

When a signal enters the CPU 16 from the vehicle sensor 12, the CPU 16 controls the motor 10 such that the motor 10 is driven at certain intervals when the vehicle is determined to be at a stop. When the vehicle is determined to be running, the CPU 16 controls the motor 10 when the stable running conditions are satisfied.

Additionally, when a signal enters the CPU 16 from the vehicle height sensor 14, the CPU 16 calculates a longitudinal inclination (a pitch angle) of the vehicle from the signal corresponding to a displacement of a suspension. A single sensor system is adopted in which the vehicle height sensor 14 is provided on a suspension for a rear right-hand side wheel, and pitch angles of the vehicle can be estimated from changes in height detected by the vehicle height sensor 14. Then, the CPU 16 sends a control signal to the motor driver 18 for tilting the optical axis L over a predetermined distance in a direction that cancels a pitch angle so detected.

The storage part 20 stores pitch angle data detected by the vehicle height sensor 14 and calculated by the CPU 16. As shown in FIG. 2A, ten data D1 to D10 are stored in a storing portion 20A of the storage part 20 which are sampled for one second at intervals of 100 ms. In addition, thirty data D1 to D30 are stored in a storing portion 20B of the storage part 20 which are sampled for three seconds at intervals of 100 ms. The storage part 20 is configured such that new data are captured in the storing portions 20A, 20B every 100 ms, respectively, while the oldest data are discarded (older data are sequentially rewritten with newer data).

Moreover, as shown in FIG. 2C, the storage part 20 comprises a storing portion 20C for storing current pitch angle data, a storing portion 20D for storing pitch angle data one second before, a storing portion 20E for storing pitch angle data two seconds before and a storing portion 20F for storing pitch angle data three seconds before. A newly detected one second average pitch angle is written in the current pitch angle storing portion 20C every time one second elapses. The current pitch angle stored in the storing portion 20C is shifted to the storing portion 20D, the one-second-before pitch angle stored in the storing portion 20D is shifted to the storing portion 20E, the two-second-before pitch angle stored in the storing portion 20E is shifted to the storing portion 20F, and the three-second-before pitch angle stored in the storing portion 20F is deleted.

Furthermore, the CPU 16 determines whether the lighting switch 11 is switched on or off and sends a control signal to the motor driver 18 for driving the motor 10 when the lighting switch 11 is switched on.

In addition, the CPU 16 sends a control signal to the motor driver 18 for driving the motor 10 when a predetermined interval time has elapsed, which is set in the interval timer 22 while the vehicle is at a stop.

The range over which the optical axis of the headlamp 1 can be tilted is determined, and therefore, a maximum driving time of the motor 10 required for a single leveling is also determined. If an interval (time) at which the motor is driven is shorter than the maximum driving time of the motor 10 required for a single leveling, the motor 10 may be driven so frequently to follow sequentially changes in vehicle posture (pitch angle) associated with passengers getting into and out of the vehicle, that the motor 10 repeats clockwise and counterclockwise rotation, stopping with the optical axis L (the motor 10) never reaching a target position. Thus, this may lead to a reduced service life of the motor.

To address this, the interval at which the motor is driven is set to a time (for example, ten seconds) longer than the maximum driving time of the motor 10 required for a single leveling so that the target position of the optical axis is prevented from changing while a leveling operation is carried out (while the motor is operated).

While the vehicle is stopped, the CPU 16 controls the driving of the motor 10 based on latest one second average pitch angle data (an average taken from the data D1 to D10) stored in the storage part 20 (the storing portion 20A). If the timing of interval control substantially coincides with the start of the vehicle, the motor 10 is controlled based on accurate pitch angle data obtained prior to the start of the vehicle while it is at a stop (pitch angle data when the vehicle is stopped, which is stored in the storage part 20) rather than on improper pitch angle data based on a change in posture during the start of the vehicle.

Figure 6:
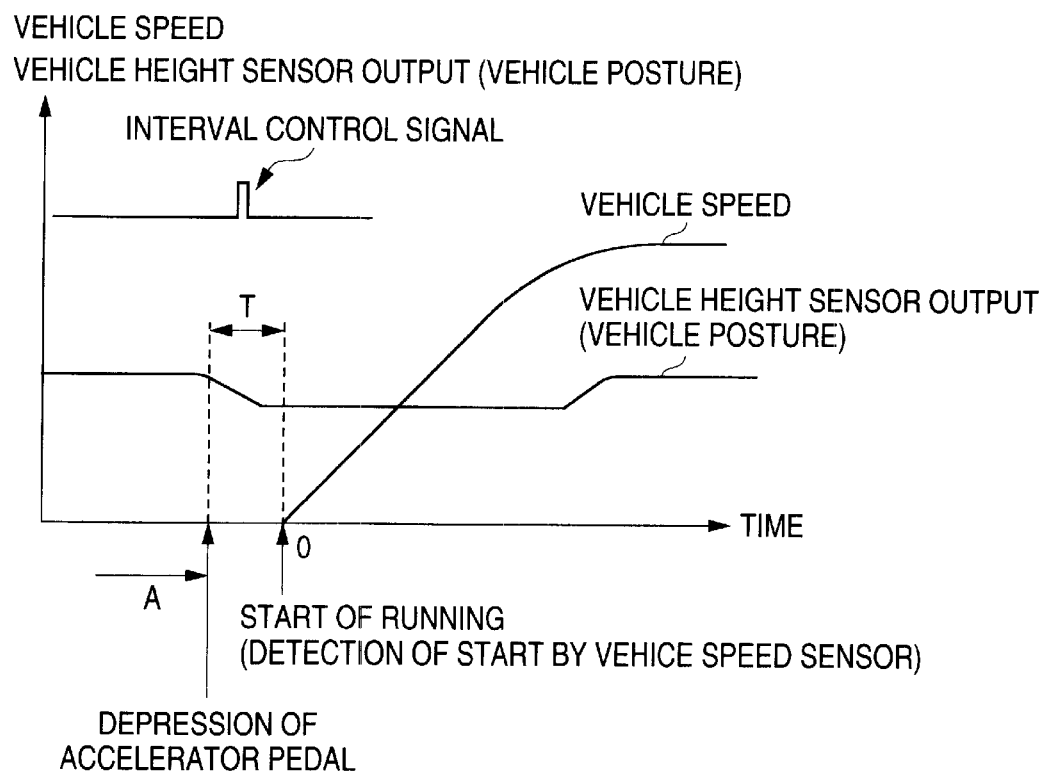
FIG. 6 is a chart showing transitions of the vehicle speed, the output from the vehicle height sensor (vehicle posture) and an actuator driving control signal from the vehicle starts after the accelerator pedal is depressed until the vehicle reaches a constant running speed.

As shown in FIG. 6, pitch angle data detected within a time (a start detection delay time) T, which is between the accelerator pedal is depressed and the vehicle speed sensor detects the start of the vehicle, are not necessarily accurate because of the fact that the vehicle is lowered when it starts. If an interval control is carried out within the start detection delay time T (three seconds), it is assumed that the motor 10 is controlled based on improper pitch angle data detected while the rear part of the vehicle is lowered. In addition, the time T required before the vehicle sensor 12 detects the start of the vehicle (a start detection delay time) ranges in general from 1 to 3 seconds, depending on the type of vehicle. However, the time T should not exceed 3 seconds. In the embodiment, the start detection delay time T is set to be 3 seconds. It is determined that an interval control based on improper pitch angle data is performed if the vehicle speed sensor 12 detects the start of the vehicle within 3 seconds after the interval control is carried out. The motor 10 is controlled using proper pitch angle data (three-second-before pitch angle data) detected prior to the start of the vehicle (refer to reference character A in FIG. 6) while the vehicle is at a stop and stored in the storing portion 20F of the storage part 20.

The timer A28 detects the time between the execution of the interval control and the detection of the start of the vehicle by the vehicle speed sensor 12.

The CPU 16 controls the motor 10 based on latest one-second average pitch angle data detected by the vehicle height sensor 14 while the vehicle is at a stop. However, leveling (correcting the optical axis) may be carried out based on pitch angle data detected while the vehicle is stopped improperly such as stopped along a slope or stopped on a curb. This erroneous leveling can be corrected by controlling the motor 10 once while the vehicle is running stably based on pitch angle data detected during that time. If the pitch angle data detected while the vehicle is at a stop are proper (for example, not stopped along a slope or on a curb), the pitch angle data detected during the stable running condition is substantially equal to that detected while the vehicle is at a stop. Therefore, the position of the optical axis leveled based on the pitch angle data during the vehicle is running stably should be substantially identical to the position of the optical axis leveled while the vehicle is at a stop.

The CPU 16 continuously detects signals from the vehicle height sensor 14, performs sampling quickly (100 ms) and calculates one-second average pitch angle data and three-second average pitch angle data. While the vehicle is stopped, the motor 10 is controlled at intervals of ten seconds. While the vehicle is running, the motor 10 is designed to be driven when the vehicle speed is equal to or faster than a reference value, and the acceleration is equal to or less than a reference value and when the above two conditions continues for a certain length of time or longer.

On an irregular road surface, a vehicle normally could not run at a speed equal to or faster than 30 km/h. Also, to avoid a drastic acceleration, which changes the vehicle posture, it is appropriate not to exceed the acceleration of 0.78 m/s$^2$. Therefore, a vehicle is defined to be running stably if the vehicle speed is equal to or faster than 30 km/h and the acceleration is equal to or less than 0.78 m/s$^2$ over three seconds or longer. The operation of pitch angles of the vehicle is designed to be performed when the above condition is satisfied. Thus, detection of an improper value or its influence is reduced by adapting the above definition for the control of the actuators. Whether the stable running condition continues over three seconds or longer is determined by the CPU 16 which starts the stable running time detection timer 28 when the vehicle speed is 30 km/h or faster and the acceleration is 0.78 m/s$^2$ or less is confirmed.

Next, the control of the motor 10 by the CPU 16 will be described using a flowchart shown in FIG. 3.

In Steps 102, 104, vehicle speed and acceleration are calculated from outputs from the vehicle sensor 12, respectively. In Steps 106, 108, one-second average pitch angle data and three-second average pitch angle data are calculated from outputs from the vehicle height sensor 14, respectively. In the following step 110, whether or not the headlamp is illuminated is determined from an output from the lighting switch 11. If the headlamp is being illuminated, the flow advances to Step 112, while if the headlamp is being switched off, the flow returns to Step 102 after a running correction flag is reset in Step 111.

In Step 112, whether or not the vehicle has shifted from a stopped state to a starting state is determined from an output from the vehicle speed sensor 12.

In Step 112, if the vehicle has not shifted, whether or not the vehicle is running is determined in Step 104. In Step 114, if the vehicle is at a stop, a running correction flag is reset in Step 115. If the control of the motor (the correction of the optical axis) is already completed based on the pitch angle data detected while the vehicle is running, the running correction flag is reset in Step 115. A running correction flag designed to be set in Step 137 is described later.

The flow advances to Step 116, where whether or not a second has elapsed after the vehicle has stopped is determined by the stop time detection timer 24. If one second has elapsed, in Step 161, a two-second-before pitch angle stored in the storing portion 20E of the storage part 20 is shifted to the storing portion 20F, and three-second-before pitch angle stored in the storing portion 20F is deleted. In Step 162, one-second-before pitch angle stored in the storing portion 20D is then shifted to the storing portion 20E. In Step 163, a current pitch angle stored in the storing portion 20C is shifted to the storing portion 20D. In Step 164, one-second average pitch angle detected is written in the storing portion 20C, and the flow moves to Step 117.

On the other hand, in Step 116, if one second has not elapsed since the vehicle is brought to a stop, the flow advances directly to Step 117 without passing through Steps 161 to 164. In Step 117, whether or not the interval time (ten seconds) has elapsed is determined by the interval timer 22. In Step 117, if ten seconds has elapsed, the timer A 26 is reset, that is, the timer A 26 for detecting a time between the interval control has been completed and the start of the vehicle is detected, is cleared in Step 118A. In Step 119, the one-second average pitch angle stored in the storing portion 20C of the storage part 20 is selected. Then, the flow moves to Step 120, at which a control signal based on the selected one-second average pitch angle is sent to the motor driver 18 for driving the motor 10. Then, the flow returns to Step 102.

On the other hand, in Step 117, if ten seconds has not yet elapsed, after counting up the timer A 26 in Step 118, the flow returns to Step 102 without driving the motor 10.

In addition, in Step 114, if the vehicle is running, the timer A 26 is reset in Step 128. Then,the flow advances to Step 130. In Step 130, whether or not the running correction flag is set, that is, whether or not the optical axis is corrected or whether or not a leveling is carried out, is determined. Then, if the running correction flag is not set, that is, if no correction of the optical axis or no leveling is carried out while the vehicle is running, whether or not the vehicle speed is equal to or faster than the reference value (30 km/h) is determined in Step 131. If the vehicle speed is equal to or faster than 30 km/h, whether or not the acceleration is equal to or less than the reference value (0.78 m/s$^2$) is determined in Step 132. In Step 132, if the acceleration is equal to or less than 0.78 m/s$^2$, the stable running time detection timer 28 is counted up in Step 133. In Step 134, whether the vehicle speed is equal to or faster than 30 km/h and the acceleration is equal to or less than 0.78 m/s$^2$ at least for a predetermined length of time (three seconds)is determined.

In Step 134, if the vehicle speed is equal to or faster than 30 km/h and the acceleration is equal to or less than 0.78 m/s$^2$ for over three seconds or longer, the flow advances to Step 135, where the stable running time detection timer 28 is reset. Then, the flow advances to Step 137.

In Step 137, the running correction flag is reset, and the flow moves to Step 138, where a three-second average pitch angle is selected. Then, in Step 120, a control signal based on the three-second average pitch angle data is sent to the motor driver 18 for driving the motor 10, and the flow returns to Step 102.

In addition, if the running correction flag is reset in Step 130, (the correction of the optical axis, i.e., the leveling is carried out while the vehicle is running) or if the vehicle speed is slower than the reference value of 30 km/h, and the acceleration exceeds the reference value of 0.78 m/S$^2$ in Steps 131, 132, the count of the stable running time detection timer 28 is reset in Step 139. The flow then returns to Step 102.

Additionally, if the vehicle speed is equal to or faster than the reference value of 30 km/h, and the acceleration is equal to or less than the reference value of 0.78 m/S$^2$, but the above conditions do not continue over three seconds or longer in Step 134, the flow returns to Step 102 without driving the motor 10.

On the other hand, in Step 112, if the vehicle is shifted from a stop to a run, i.e., the vehicle starts, whether or not the stop is equal to or shorter than 3 seconds (which is equal to the start detection delay time of the vehicle speed sensor 12) is determined by the stop time detection timer 24 in Step 121. Then, in Step 121, if it takes 3 seconds or shorter before the vehicle is shifted from a stop to a run, the time from a stop to a run does not exceeds the start detection delay time of the vehicle speed sensor 12 (3 seconds), and there is no vehicle pitch angle data that are not affected by the lowering of the vehicle prior to the depression of the accelerator pedal. The flow returns to Step 102 without driving the actuator.

Furthermore, in Step 121, if it takes 3 seconds or longer from a stop to a start, the time required until the vehicle starts from a stop exceeds the start detection delay time (3 seconds) of the vehicle sensor, and vehicle pitch angle data which are not affected by the lowering of the vehicle prior to the depression of the accelerator pedal exist. Then, the flow moves to Step 122, where whether or not the stop time is equal to or longer than the interval time (ten seconds) is determined by the stop time detection timer 24. If the stop time is less than ten seconds in Step 122, then the flow moves to Step 124. In Step 124, three-second-before pitch angle data stored in the storing portion 20F of the storage part 20 are selected, and in Step 120, a control signal based on the three-second-before pitch angle data is sent to the motor driver 18 for driving the motor 10. The flow then returns to Step 102.

Additionally, in Step 122, if the stop time is ten seconds or longer, the flow advances to Step 126, where whether or not the timer A 26 is equal to or shorter than 3 seconds, or whether or not a time between the timing of driving the actuator and the timing of the detection of the start by the vehicle speed sensor 12 is equal to or shorter than the start detection delay time of the vehicle speed sensor 12 (3 seconds) is determined. Then, in Step 126, if an improper pitch angle based on the lowering of the vehicle is assumed to be detected by the vehicle height sensor and stored in the storage part, the flow advances to Step 127, where the three-second-before pitch angle stored in the storing portion 20F of the storage part 20 are selected. Then, in Step 120, a control signal based on the selected three-second-before pitch angle data is sent to the motor driver 18 for driving the motor 10. The flow then returns to Step 102. On the other hand, in Step 126, if no improper pitch angle is assumed to be detected, the flow returns to Step 102 without driving the actuator.

Figure 4:
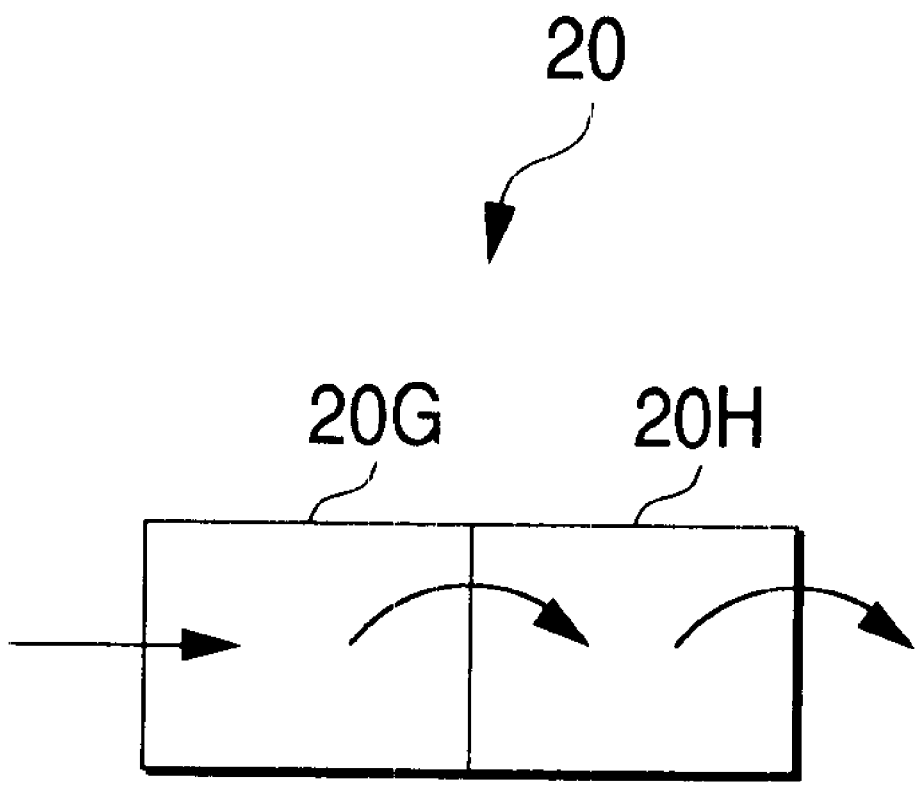
FIG. 4 is a diagram showing a configuration of a main part of a storage part of an automatic leveling system for automotive headlamps according to a second embodiment of the invention.
Figure 5:
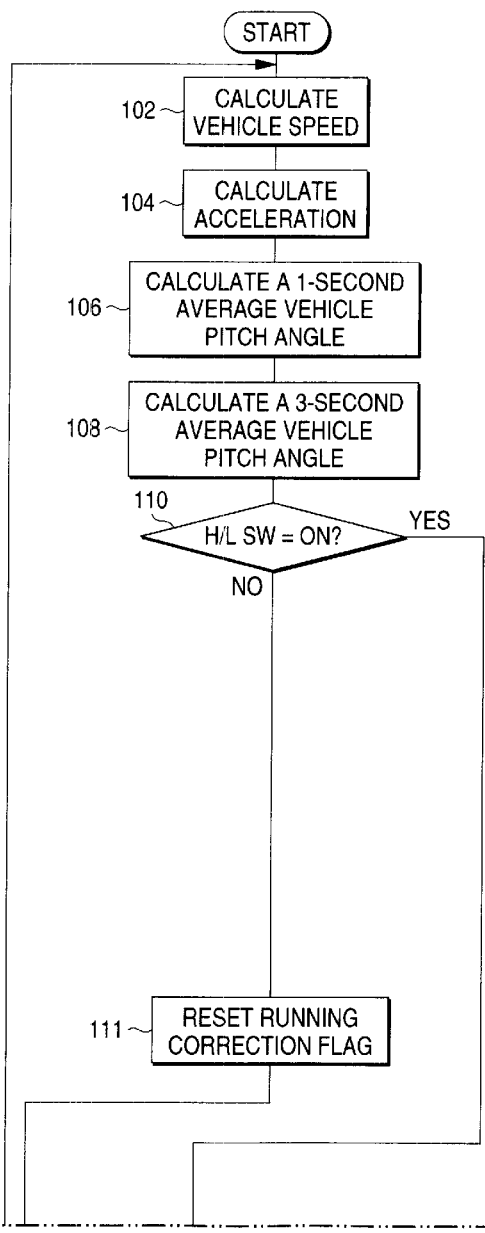
FIG. 5 is a diagram showing a flowchart of a CPU which is a control part of the automatic leveling system.

FIGS. 4, 5 show a second embodiment of the invention. FIG. 4 is a diagram showing the construction of a part of an automatic leveling system for automotive headlamps FIG. 5 is a diagram showing a flowchart of a CPU which is a control part of the automatic leveling system.

In this second embodiment, a counter C (not shown) is provided for counting the number of times of performing the interval control while the vehicle is at a stop.

In addition, as shown in FIG. 4, the storage part 20 comprises a storing portion 20G for storing current pitch angle data and a storing portion 20H for storing pitch angle data used for the previous interval control. Newly selected pitch angle data are stored in the storing portion 20G every time the interval time (ten seconds) has elapsed, and then the current pitch angle data stored in the storing portion 20G are shifted to the storing portion 20H, the previous pitch angle data stored in the storing portion 20H are then deleted.

If an interval control is carried out for the first time or a first interval control is carried out, the actuator is controlled based on the three-second-before pitch angle data. If the interval control is carried out for the second time or more, because there was an interval control based on proper pitch angle data before, the actuator is controlled by using the one-second average pitch angle data used for the previous interval control. Thus, a proper automatic leveling can be attained.

The process flow of the CPU 16 according to the second embodiment is different from the process flow of the CPU 16 according to the first embodiment in steps between Step 117 and Step 120, as well as between Step 126 and Step 127, which correspond to the aforesaid different configuration. Because the remaining portions of the process flow of the second embodiment are identical to the process flow of the first embodiment, the different process flow steps will be described and like reference numerals are given to like portions. The description of the remaining flow portions will be omitted.

In Step 117, if ten seconds has elapsed, the timer A 26 is reset in Step 118A. Then in Step 118C, the counter C for counting up the number of times of carrying out the interval control is counted up, and thereafter, in Step 119, the one-second average pitch angle data are selected. Then, in Step 119A, pitch angle data stored in the storing portion 20G are shifted to the storing portion 20H. In Step 119B, newly detected one-second average pitch angle data are stored in the storing portion 20G. Thus, the driving of the actuator is controlled based on the one-second average pitch angle data so stored.

In Step 126, if the time required for the vehicle sensor to detect the start of the vehicle after the depression of the accelerator pedal is equal to or shorter than the start detection delay time (3 seconds) of the vehicle speed sensor and if the actuator is assumed to be controlled based on the improper pitch angle data because of the lowering of the vehicle, the flow moves to Step 126A, and whether or not the counter C is equal to or greater than 2 is determined. If the interval control is carried out for the first time, the flow advances to Step 127, and three-second-before pitch angle data stored in the storage part 20 are selected. On the other hand, in Step 126A, if the interval control has been carried out twice or more times, the actuator is controlled using the one-second average pitch angle data used for the previous interval control.

In Step 128, while the vehicle is running, the timer A 26 is reset, and after the counter C is reset in Step 129, the flow is designed to advance to Step 130.

In the two embodiments described above, while the interval (time) at which the actuator (motor) is driven is described as being ten seconds, the interval time is not limited to ten seconds but may be set optionally relative to the maximum driving time of the actuator (motor).

Additionally, in the above embodiments, while the stable running condition is described as such that the vehicle speed is 30 km/h or faster and the acceleration is 0.78 m/s$^2$ or less, and that these continue for over 3 seconds, but the stable running condition is not limited to the specific conditions described above.

In addition, in the above embodiments, while the automatic leveling of the reflector moving type headlamp in which the reflector 5 is tiltably supported relative to the lamp body 2 fixed to the vehicle body, the invention can be equally applied to the automatic leveling of a unit moving type headlamp in which the lamp body and the reflector unit are tiltably provided relative to the lamp housing fixed to the vehicle body.

According to the automatic leveling system of the first embodiment of the invention, because the driving of the actuator through the automatic leveling is designed to occur at every certain interval time while the vehicle is stopped, the number of times of activating the actuator, power consumption, and the wear on members of the driving mechanism are all reduced. Thus, an automatic leveling system that is inexpensive and than can operate accurately can be provided.

In addition, if the timing of carrying out the interval control coincides with the start of the vehicle, because the actuator is controlled based on the proper pitch angle data detected while the vehicle is stopped, the proper automatic leveling can be provided while the vehicle is stopped, or when the vehicle starts.

Furthermore, according to the second and third embodiments of the invention, because the improper interval control can easily be specified, the control of the automatic leveling can be carried out smoothly.

Moreover, according to the fourth embodiment of the invention, because the control based on optimum data can be carried out whether or not an interval control is carried out, or whether or not there exists data detected prior to the depression of the accelerator pedal, an optimal automatic leveling can be realized.

In addition, according to the fifth embodiment of the invention, because pitch angle data detected a certain time can be fetched and moreover since the capacity of the storage part does not have to be expanded, the automatic leveling system is simple in construction and low in cost.

Additionally, according to the sixth embodiment of the invention, because the actuator is designed not to be driven as long as the headlamp is not illuminated, the number of times the actuator is operated is reduced. Thus, power is conserved, and the wear of the members of the driving mechanism is reduced Therefore, an automatic leveling system that is economical and that can operate more accurately can be provided.

Moreover, according to the seventh embodiment of the invention, because the number of times the actuator is driven is reduced, an automatic leveling system that can operate accurately over a long period of time can be provided.

The present invention claims priority from Japanese patent application serial no. H11-368918, which is incorporated herein by this reference in its entirety.

Several embodiments of the invention have been described herein, but it should be understood that various additions and modifications could be made which fall within the scope of the following claims.

What is claimed is:

1. An automatic leveling system for automotive headlamps comprising:
   headlamps optical axes adapted to tilt vertically relative to a body of a vehicle;
   control means for controlling actuators to correct the tilt of the optical axes;
   vehicle speed detecting means for detecting speeds of the vehicle;
   pitch angle detecting means for detecting pitch angles of the vehicle; and a storage part for storing pitch angle data of the vehicle detected by said pitch angle detecting means;
   wherein said control means is configured to control said actuators based on pitch angle not influenced by a change in posture of the vehicle resulting when the vehicle starts.

2. The automatic leveling system for automotive headlamps as set forth in claim 1, wherein if the start of the vehicle is detected by said vehicle speed detecting means within a predetermined set time after a control of said actuators is carried out, said control means determines that said control and the start of the vehicle substantially coincide with each other.

3. The automatic leveling system for automotive headlamps as set forth in claim 2, wherein said predetermined set time is equal to or longer than an interval of time between the depression of an accelerator pedal and the detection of the start of said vehicle.

4. The automatic leveling system for automotive headlamps as set forth in claim 1, wherein if the actuators have been controlled more than once before they are controlled at the time of the start of the vehicle, pitch angle data detected before the start of the vehicle are used for controlling the actuators.

5. The automatic leveling system for automotive headlamps as set forth in claim 1, if the actuators are controlled for the first time, pitch angle data which is detected just previous to the depression of the accelerator pedal while the vehicle is at a stop is used for controlling the actuators.

6. The automatic leveling system for automotive headlamps as set forth in claim 1, if the actuators are controlled for the first time and no pitch angle is detected previous to the depression of the accelerator pedal, said actuators are prevented from being driven.

7. The automatic leveling system for automotive headlamps as set forth in claim 1, wherein said storage part is configured such that older pitch angle data are replaced with newer pitch angle data in the order stored when latest pitch angle data are entered to update the pitch angle data.

8. The automatic leveling system for automotive headlamps as set forth in claims 1, wherein controlling the driving of said actuators is carried out on condition that said headlamps are illuminated.

9. The automatic leveling system for automotive headlamps as set forth in claim 1, wherein an interval at which said actuators are driven is configured such that said interval becomes longer than a maximum driving time of said actuators needed to perform a single leveling.

* * * * *